US011449586B2

(12) United States Patent
Mitchell et al.

(10) Patent No.: US 11,449,586 B2
(45) Date of Patent: Sep. 20, 2022

(54) AUTHENTICATED INTENTION

(71) Applicant: Massachusetts Institute of Technology, Cambridge, MA (US)

(72) Inventors: John Darby Mitchell, Beford, MA (US); Uri Blumenthal, Westford, MA (US); Benjamin Woodbury Fuller, Mansfield, CT (US); Robert Kevin Cunningham, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 50 days.

(21) Appl. No.: 16/055,779

(22) Filed: Aug. 6, 2018

(65) Prior Publication Data

US 2020/0026835 A1  Jan. 23, 2020

Related U.S. Application Data

(60) Provisional application No. 62/701,004, filed on Jul. 20, 2018.

(51) Int. Cl.
| G06F 21/00 | (2013.01) |
| H04L 29/06 | (2006.01) |
| G06F 21/32 | (2013.01) |
| H04L 9/32 | (2006.01) |
| G06F 3/041 | (2006.01) |
| G06F 3/0354 | (2013.01) |
| G06F 3/04883 | (2022.01) |
| G06V 40/12 | (2022.01) |

(52) U.S. Cl.
CPC .......... *G06F 21/32* (2013.01); *G06F 3/03543* (2013.01); *G06F 3/041* (2013.01); *G06F 3/04883* (2013.01); *G06V 40/1365* (2022.01); *H04L 9/3247* (2013.01); *G06F 2203/0336* (2013.01)

(58) Field of Classification Search
CPC ...... G06F 21/32; G06F 3/041; G06F 3/03543; G06F 3/04883; G06F 2203/0336; G06F 3/017; G06K 9/00087; H04L 9/3247; H04L 9/0866; H04L 9/3231; H04W 12/00
See application file for complete search history.

(56) References Cited

U.S. PATENT DOCUMENTS 5,838,306 A * 11/1998 O'Connor ........... G06F 3/03543
                                                    345/163
5,991,431 A * 11/1999 Borza ..................... G01B 11/24
                                                    345/164

(Continued)

OTHER PUBLICATIONS

Frank Abagnale, Intel Identity:Protection Technology: The Robust, Convenient, and Cost-Effective Way to Deter Identity Theft, Apr. 20, 2014, 16 pages.

(Continued)

*Primary Examiner* — Lisa C Lewis
(74) *Attorney, Agent, or Firm* — Daly, Crowley, Mofford & Durkee LLP

(57) ABSTRACT

An aspect of authenticating a user via a processing system includes receiving, at an input device of the processing system, an input gesture corresponding to an explicit assertion of user intent with respect to a function to be performed on the processing system; and simultaneously authorizing and authenticating the user, with respect to the function, from data acquired from the input gesture.

3 Claims, 12 Drawing Sheets

(56) References Cited

U.S. PATENT DOCUMENTS

| | | | |
|---|---|---|---|
| 7,043,643 B1 | 5/2006 | Doe et al. | |
| 7,673,141 B2 | 3/2010 | Kilian-Kehr et al. | |
| 8,079,062 B2 | 12/2011 | Jennings et al. | |
| 8,516,609 B2 | 8/2013 | Woodward et al. | |
| 8,598,981 B2 | 12/2013 | Idsøe | |
| 8,665,061 B2 | 3/2014 | Kagan et al. | |
| 8,670,946 B2 | 3/2014 | Salazar et al. | |
| 8,890,815 B2 | 11/2014 | Bilbrey et al. | |
| 8,904,187 B2 | 12/2014 | Saito et al. | |
| 8,928,455 B2 | 1/2015 | Idsøe | |
| 8,943,580 B2 * | 1/2015 | Fadell | G06K 9/00087 726/19 |
| 8,955,083 B2 | 2/2015 | Ettorre et al. | |
| 8,972,741 B2 | 3/2015 | Awatsu et al. | |
| 9,049,010 B2 | 6/2015 | Jueneman et al. | |
| 9,158,957 B2 | 10/2015 | Boshra et al. | |
| 9,250,795 B2 | 2/2016 | Fadell et al. | |
| 9,477,827 B1 | 10/2016 | Daniel | |
| 9,503,260 B2 | 11/2016 | Brands | |
| 9,607,189 B2 | 3/2017 | Gardiner et al. | |
| 9,747,429 B2 | 8/2017 | McFarland | |
| 9,805,245 B2 | 10/2017 | Shimahara | |
| 9,826,922 B2 | 11/2017 | Datta et al. | |
| 9,857,589 B2 | 1/2018 | Lundberg | |
| 10,000,128 B2 | 6/2018 | Outwater et al. | |
| 10,028,135 B2 * | 7/2018 | Abdirashid | H04L 9/0894 |
| 2002/0054695 A1 * | 5/2002 | Bjorn | G06K 9/00013 382/124 |
| 2005/0021982 A1 | 1/2005 | Popp et al. | |
| 2005/0194452 A1 * | 9/2005 | Nordentoft | G06Q 20/40145 235/492 |
| 2007/0057763 A1 * | 3/2007 | Blattner | G06F 21/32 340/5.52 |
| 2009/0224874 A1 * | 9/2009 | Dewar | G06F 21/32 340/5.53 |
| 2010/0174922 A1 * | 7/2010 | Johnson | G06F 12/1408 713/193 |
| 2011/0136427 A1 * | 6/2011 | Al Qalqili | H04N 21/812 455/3.01 |
| 2011/0185186 A1 * | 7/2011 | Adams | H04W 12/02 713/189 |
| 2012/0212322 A1 | 8/2012 | Idsøe | |
| 2014/0366159 A1 * | 12/2014 | Cohen | G06F 21/10 726/28 |
| 2015/0028996 A1 * | 1/2015 | Agrafioti | G06F 21/83 340/5.82 |
| 2015/0036065 A1 | 2/2015 | Yousefpor et al. | |
| 2015/0319144 A1 * | 11/2015 | Barton | G06F 9/485 713/168 |
| 2017/0208049 A1 * | 7/2017 | Hu | H04L 67/10 |
| 2018/0189468 A1 * | 7/2018 | Shim | G06F 3/0484 |
| 2018/0268414 A1 * | 9/2018 | Chung | H04L 9/0643 |
| 2019/0164156 A1 * | 5/2019 | Lindemann | H04L 9/3271 |
| 2019/0188363 A1 * | 6/2019 | VanBlon | G06V 40/1365 |
| 2019/0370448 A1 * | 12/2019 | Devine | G06F 21/32 |

OTHER PUBLICATIONS

Dariusz Janiszyn, BCERT: Securing Electronic Commerce Using A Biometeric Secured Token, University of Jhannesburg, Jun. 2008, 173 pages.

Yeongjin Jang, Simon P. Chung, Bryan D. Payne, Wenke Lee, Gyrus: A Framework for User-Intent Monitoring of Text-Based Networked Applications, Feb. 23-26, 2014, 16 pages.

Babins Shrestha, Nitesh Saxena, Justin Harrison, Wave-to-Access: Protecting Sensitive Mobile Device Services via a Hand Waving Gesture, Nov. 20-22, 2013, 9 pages.

Use Security Key for 2-Step Verification—Android—Google Account Help, Feb. 13, 2018, 3 pages.

ITL Bulletin Advising Users on Information Technology, National Institute of Standards and Technology, May 2001, 8 pages.

Can the touch screen of a smart phone be used as a finger print scanner, Sep. 1, 2016, 6 pages.

* cited by examiner

# AUTHENTICATED INTENTION

PRIORITY

This application claims priority to provisional application, U.S. Ser. No. 62/701,004, filed on Jul. 20, 2018.

GOVERNMENT RIGHTS

This invention was made with Government support under Contract No. FA8702-15-D-0001 awarded by the U.S. Air Force. The Government has certain rights in the invention.

BACKGROUND

Computer security relies on authentication (i.e., to verify the identity or owner of data or a computation) and authorization (i.e., to determine if the authenticated principal has permission to access that data or perform a computation). Today's authentication methods are often cumbersome, easy to spoof, and today's authorization methods are often deployed in a coarse-grained manner to limit the amount of annoyance required by the authentication process. Many security and privacy problems in computer systems arise from providing access to too much data for too long.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for authenticating a user. The method includes receiving, at an input device of a processing system, an input gesture corresponding to an explicit assertion of user intent with respect to a function to be performed on the processing system. The method may further include authenticating and authorizing the user, with respect to the function, from data acquired from a sensor during the input.

Another aspect may provide a system for authenticating a user. The system includes a memory having computer-executable instructions and a processor executing the computer-executable instructions. The computer-executable instructions when executed by the processor cause the processor to perform operations. The operations include receiving, at an input device of the system, an input gesture corresponding to an explicit assertion of user intent with respect to a function to be performed on the system. The method may, further include authenticating and authorizing the user, with respect to the function, from data acquired from a sensor during the input.

A further aspect may provide a computer program product embodied on a non-transitory computer readable medium. The computer program product including instructions that, when executed by a computer causes the computer to perform operations. The operations include receiving, at an input device of the computer, an input gesture corresponding to an explicit assertion of user intent with respect to a function to be performed on the computer. The method may further include authenticating and authorizing the user, with respect to the function, from data acquired from a sensor during the input.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

Figure 9:
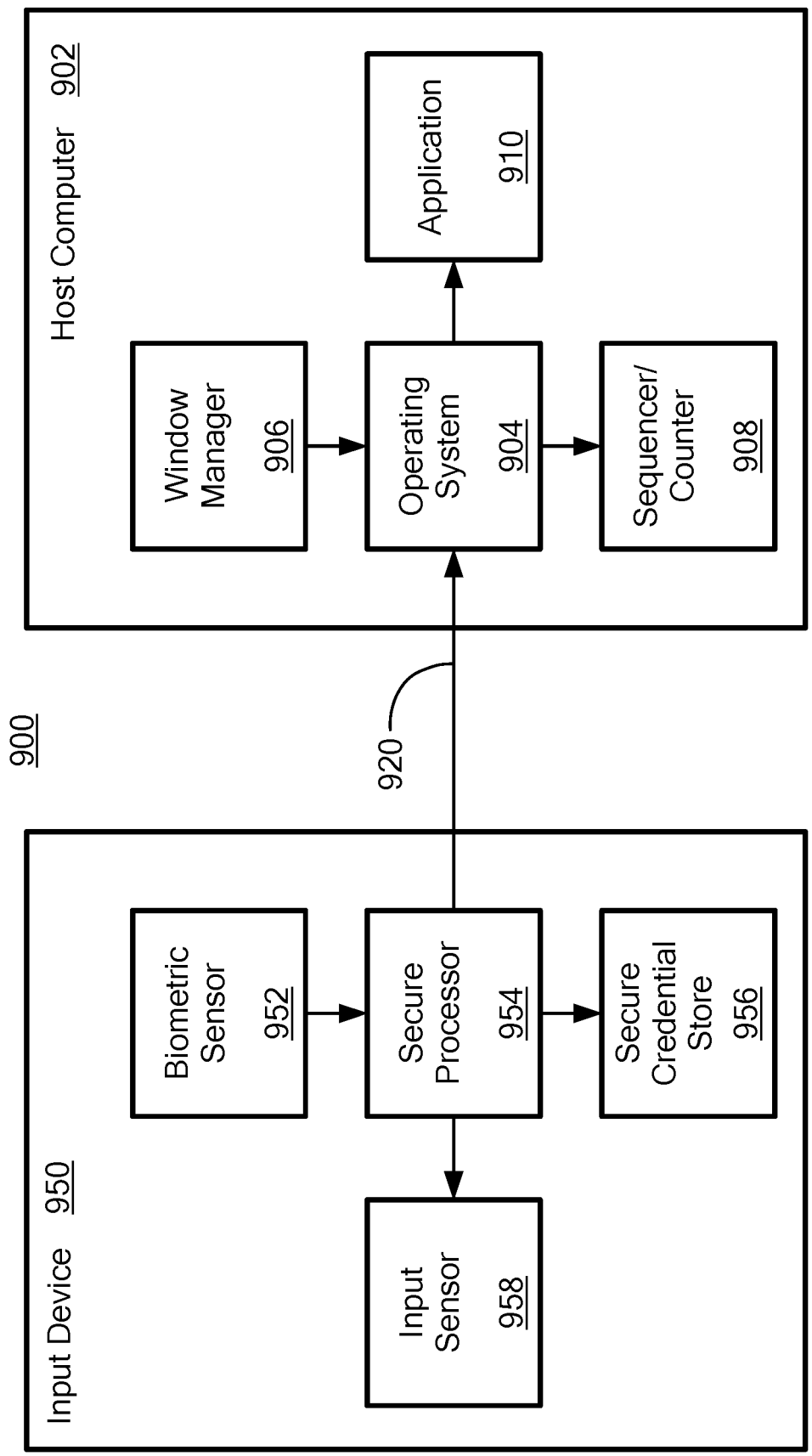
Figure 10A:
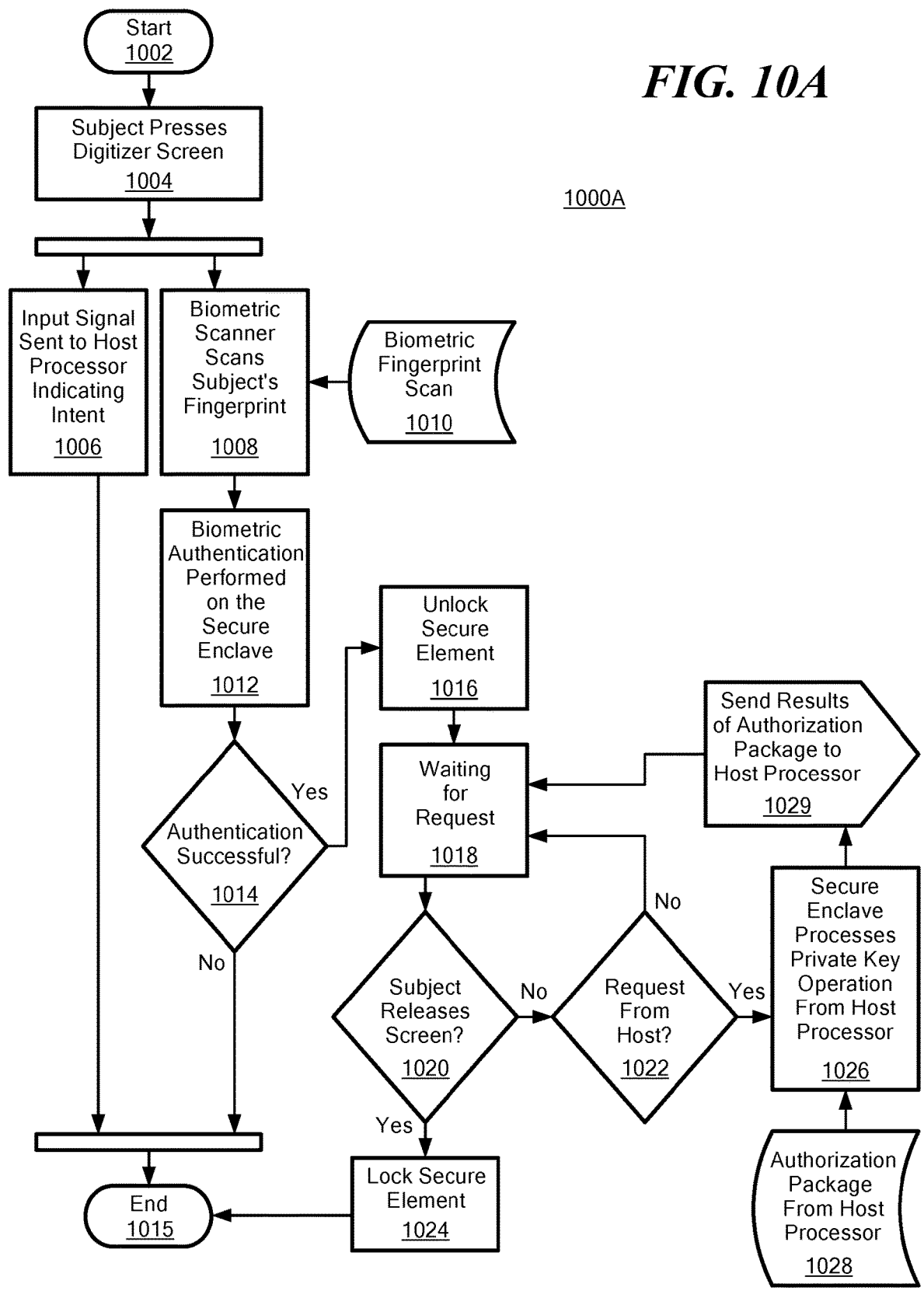
Figure 10B:
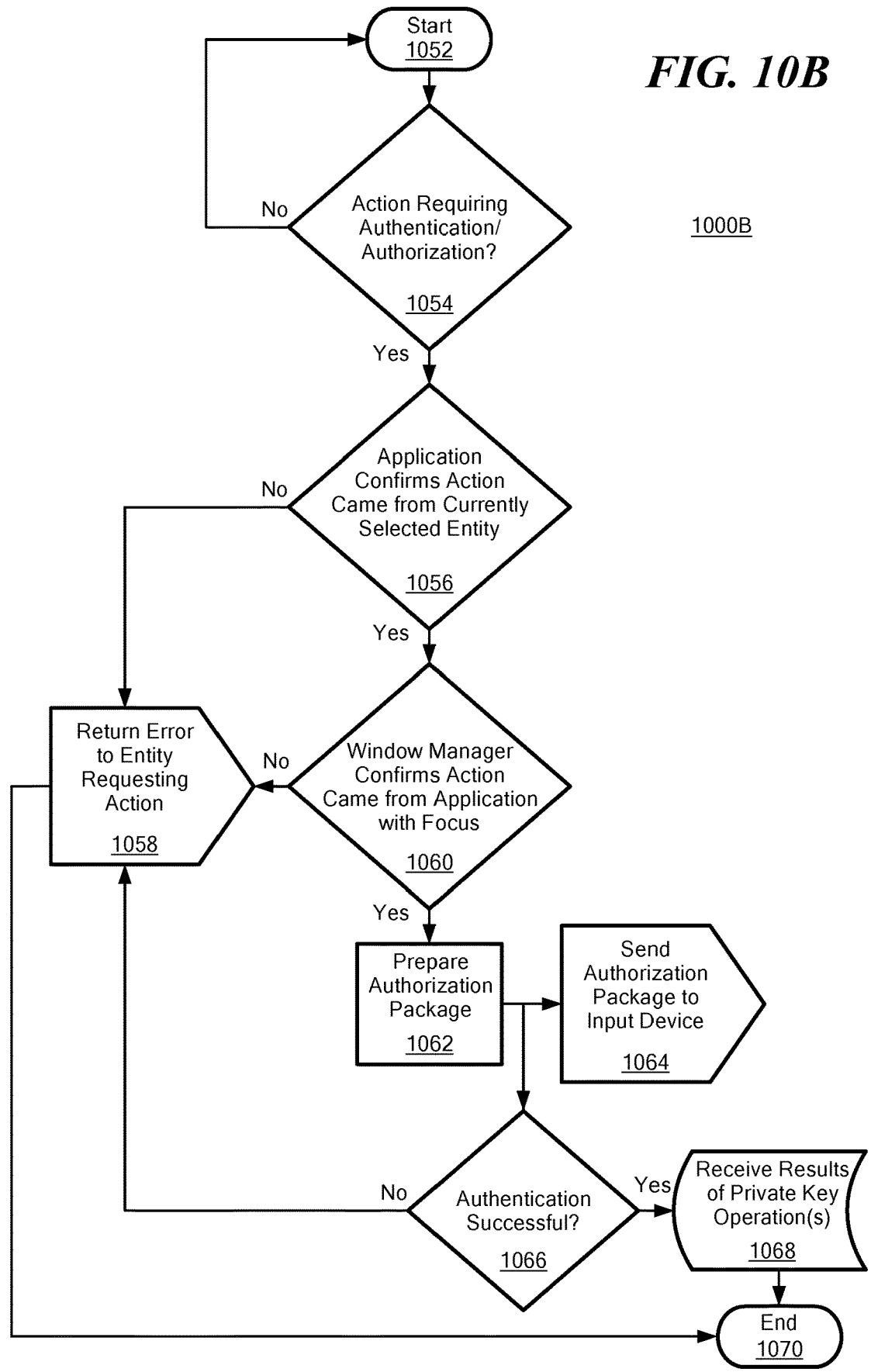

FIG. 9 a block diagram of a system upon which authenticated intention processes may be implemented in accordance with a fifth embodiment; and FIGS. 10A-10B are flow diagrams illustrating processes for performing authenticated intention processes with respect to the system of FIG. 9 in accordance with an embodiment.

DETAILED DESCRIPTION

Authenticated intention systems and processes are provided in accordance with embodiments. The authenticated intention processes seamlessly perform a biometric authentication of a user at the moment when the user wants to access an object or perform a privileged action. The authenticated intention processes further provide a way to identify an object to be accessed by standard input gestures by the user and limiting authorization to start when the gesture occurs and end when the gesture is complete. The processes also provide a way for authorizing a software entity to access specific data or perform a computation on behalf of the user and limiting the time window of that authorization based on input gestures. In addition, the authenticated intention processes provide biometric access control to grant access to cryptographic credentials limited to the duration of the biometric's placement on the sensor and localized to a selected on-screen entity. In addition, the authenticated intention processes establish an unforgeable linkage between input actuation as evidence of user intent and biometric authentication as evidence of identity, both of which establish evidence of the user's physical presence. This transparently binds a user's intent via a biometric assertion of physical presence and an unforgeable attestation of identity that leverages localized biometric authentication on an input device to unlock private keys, thereby enabling privileged operations such as decrypting or digitally signing an object. This method improves security and usability by transparently integrating authentication directly into the user's workflow and allows for more fine-grained control.

Embodiments of the techniques described herein may be implemented in a computer mouse (e.g., of a desktop computer), a laptop with a touch screen, and a computer or tablet or phone with a camera. In these embodiments, a sensor is used to take a biometric measurement to momentarily unlock and use cryptographic credentials at the moment that the user indicates an intention to perform an action requiring those cryptographic credentials. These embodiments can also be used in combination to reduce the equal error rate of the biometric system, to provide additional factors for authentication, or to address usability challenges. For example, for higher security environments, a camera that extracts facial or iris features for authentication and perform gaze tracking for the linkage to input selection could be combined with the fingerprint biometric techniques.

Figure 1:
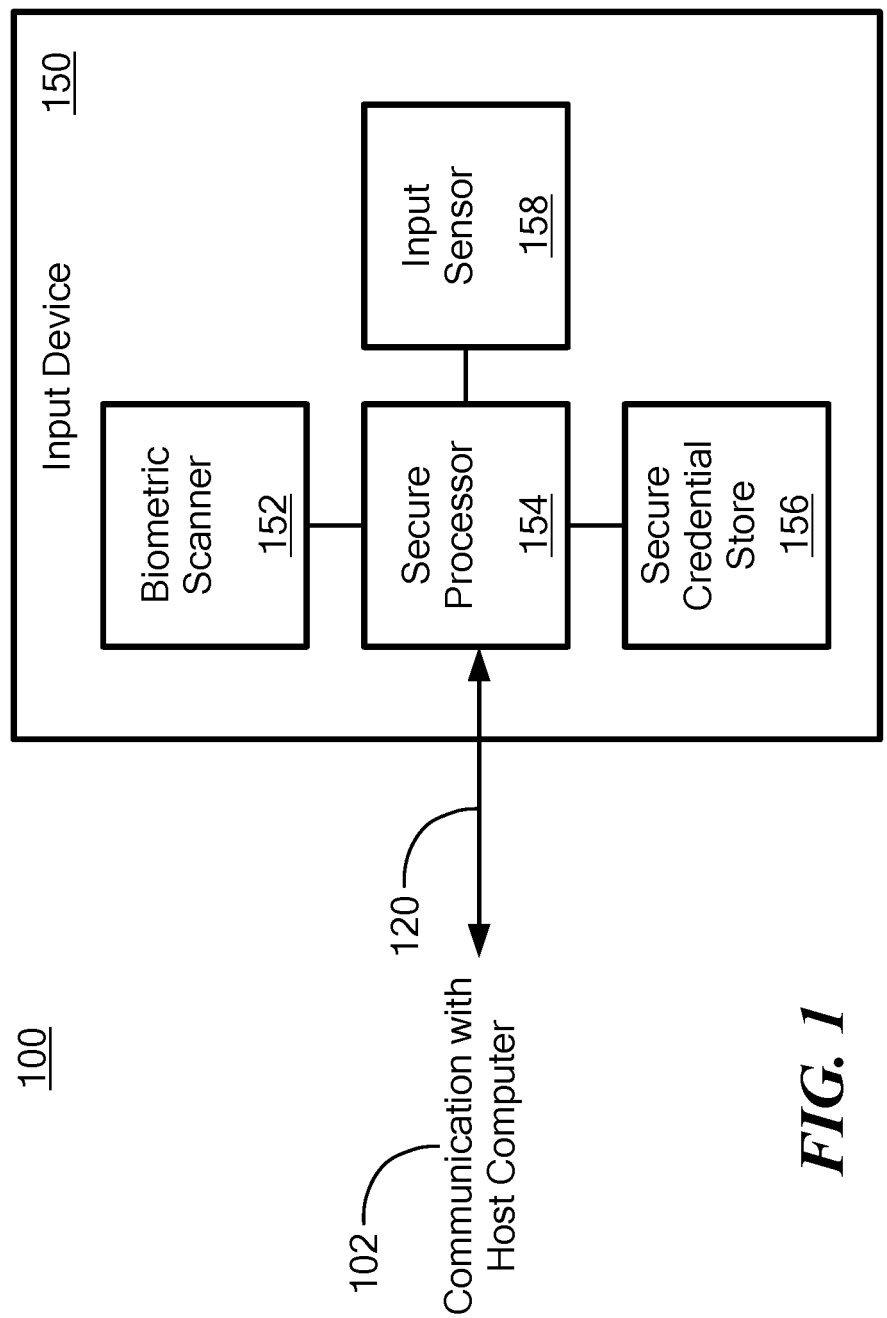
FIG. 1 is a block diagram of a high-level view of a system in which authenticated intention processes may be implemented in accordance with an embodiment.

Turning now to FIG. 1, a high-level system 100 in which authenticated intention processes may be implemented will now be described in accordance with an embodiment. The system 100 includes an input device 150 communicatively coupled to a host system computer 102. In one non-limiting embodiment, the host system computer 102 may be implemented as a general-purpose desktop or laptop. In this embodiment, the input device 150 may be a computer mouse, as will be described further herein. In an embodiment in which the input device is a computer mouse, it is understood that a communication link 120 between the input device 150 and the host system computer 102 may be a direct wired connection or a wireless communication connection.

It will be understood that the host system computer 102 may be implemented via other types of devices, such as a portable computer device (e.g., a laptop or wireless communication device, such as a smart phone, personal digital assistant, or tablet PC). In this embodiment, the input device 150 may include components of a touchscreen built into the host system computer 102, as will be described further herein. An end user may access the features of the techniques described herein via the input device 150.

The input device 150 includes a biometric seamier 152, a secure processor 154, a secure credential store 156, and an input sensor 158.

Input sensor 158 provides motion measurement of input (e.g., a mouse traveling on a desktop or a finger traveling on a digitizer screen), as well as an indication of input selection (e.g., either pressing a button on the mouse or pressing/tapping a digitizer screen). It is important that the input selection distinguishes pressing and releasing as separate events. There must be some notion of the duration of the input selection for optimal security. If the input device 150 does not distinguish input selection duration, the techniques may still be accomplished by specifying the duration as one of the configuration settings for the device. When the input sensor 158 indicates a pressed event, the biometric scanner 152 is triggered to acquire a fingerprint scan. The secure processor 154 may use any number of biometric authentication techniques to unlock the credentials in the secure credential store 156, such as biometric key derivation or pattern matching. Pattern matching is described further in FIGS. 3 and 4.

Using biometric key derivation, a cryptographic secret key is derived from the biometric data using a fuzzy extractor to ensure error resilience. This secret key is used to unlock private key operations of a public key cryptographic method on the secure credential store 156. Possible private key operations include encryption/decryption, digital signatures, and identification. It is also possible for this key to unlock symmetric cryptographic methods, these methods would operate similarly except another device would also hold the private key. We utilize the terminology of public key cryptography.

Figure 2:
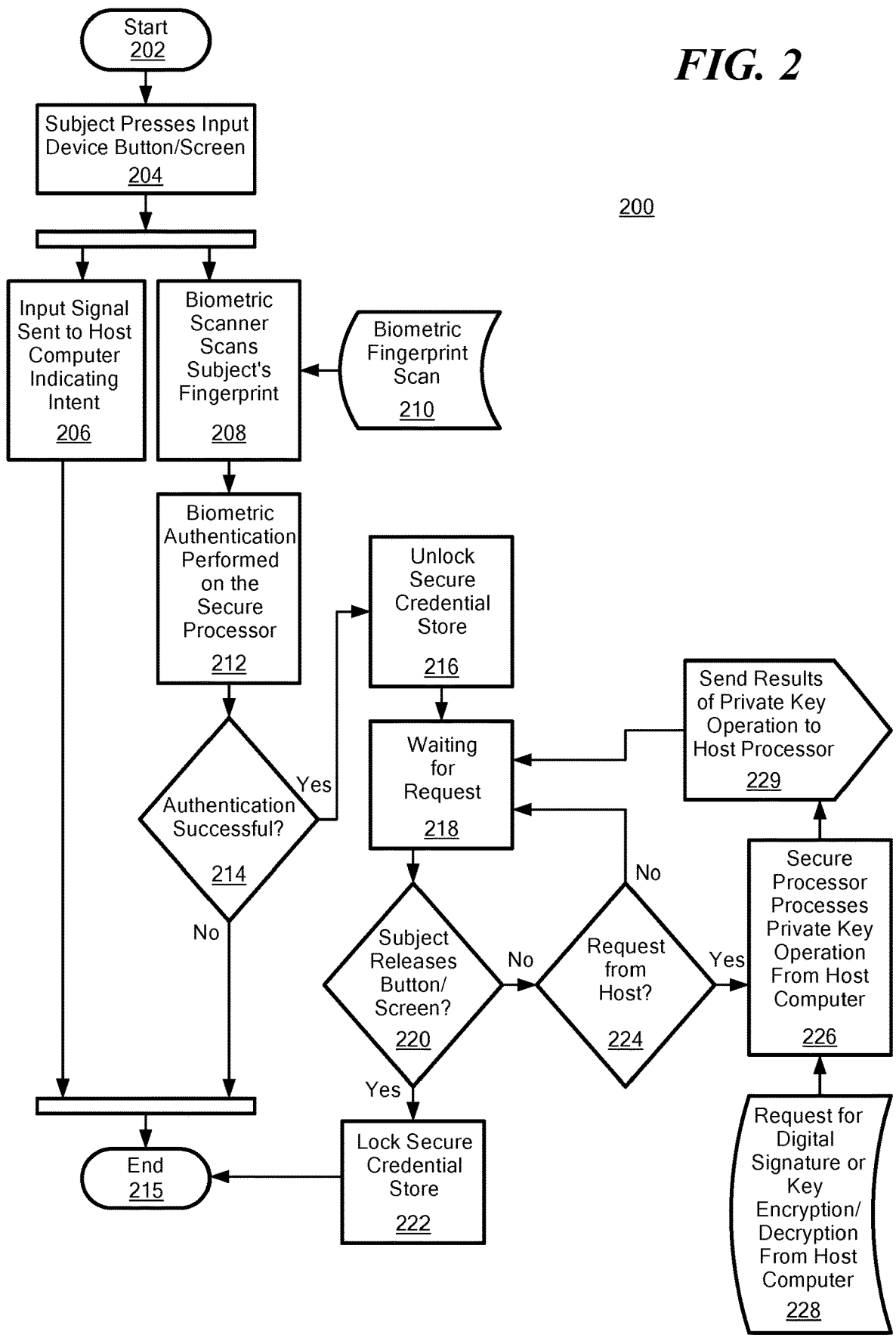
FIG. 2 is a flow diagram illustrating a process for performing authenticated intention processes with respect to the system of FIG. 1 in accordance with an embodiment.

Turning now to FIG. 2, a flow diagram illustrating a process 200 for performing authenticated intention processes with respect to the system of FIG. 1 will now be described in accordance with an embodiment. The process 200 of FIG. 2, in a non-limiting embodiment, utilizes biometric key derivation as the biometric authentication technique.

The process 200 begins in block 202 in which a subject presses an input device button (e.g., a mouse button) or screen (e.g., touch screen) in block 204. In block 206, an input signal is sent to the host computer 102 indicating an intent by the subject. In embodiments, an indication of intent refers to the presence of an input selection by a subject. The thread that sends the input signal to the host computer 102 has no subsequent actions in the process 200; thus, the flow for this action thread ends at block 215. In block 208, which may occur simultaneously with block 206, the biometric scanner 152 scans the subject's fingerprint. In block 210, the biometric scan is temporarily stored in a volatile memory location (not shown) in the input device 150 prior to processing it. In biometric key derivation, a user is first enrolled in which new credentials are generated in the secure credential store. The user would apply their finger to a biometric sensor and the fingerprint would be scanned. The newly generated credentials would be encrypted with a cryptographic key derived from their fingerprint. When the user later uses the system, their fingerprint scan is converted into the same cryptographic key. Fuzzy extraction techniques may be used to correct for errors in the image processing (e.g. finger slightly misaligned). The secure processor then attempts to decrypt the credentials in the secure credential store using the derived cryptographic key. If the derived cryptographic key matches the cryptographic key derived during enrollment, those credentials can be decrypted and used for private key operations until the input button is released. Releasing the input button zeroizes the derived cryptographic key, effectively "locking" access to the secure credential store.

In block 212, biometric authentication is performed by the secure processor 154 and, at block 214, it is determined whether the authentication is successful (e.g., successful decryption of the credentials). If not, the process 200 ends at block 215. Otherwise, the secure credential store 156 is unlocked at block 216.

At block 218, the input device 150 waits for a request (e.g., waits to receive a private key operation request or an indication that the input button was released). The input device 150 determines whether the subject has released the button or screen press at block 220. If so, the secure credential store is again locked in block 222 and the process 200 ends at block 215. Otherwise, the input device 150 determines whether a request from the host computer 102 has been received at block 224. The request may be for a private key operation. If no request is received from the host computer 102, the input device 150 continues to wait for a request for the duration of the button/screen press at block 218. Otherwise, at block 224, if a request from the host system computer 102 is received, the secure processor 154 processes the private key operation from the host computer 102 at block 226. This private key operation may be a digital signature, encryption/decryption, or identification request from the host computer 102 at block 228. Once the requested private key operation is performed, the results are sent to the host in block 229.

As shown and described in FIG. 2, the process 200 illustrates a loop condition between blocks 218-228. For example, the input device 150, for the duration of the subject input button/screen press, continuously waits for and receives requests and processes them. Once the subject releases the input button or screen press, the loop ends and the secure credential store 156 is locked (blocks 220-222).

Figure 3:
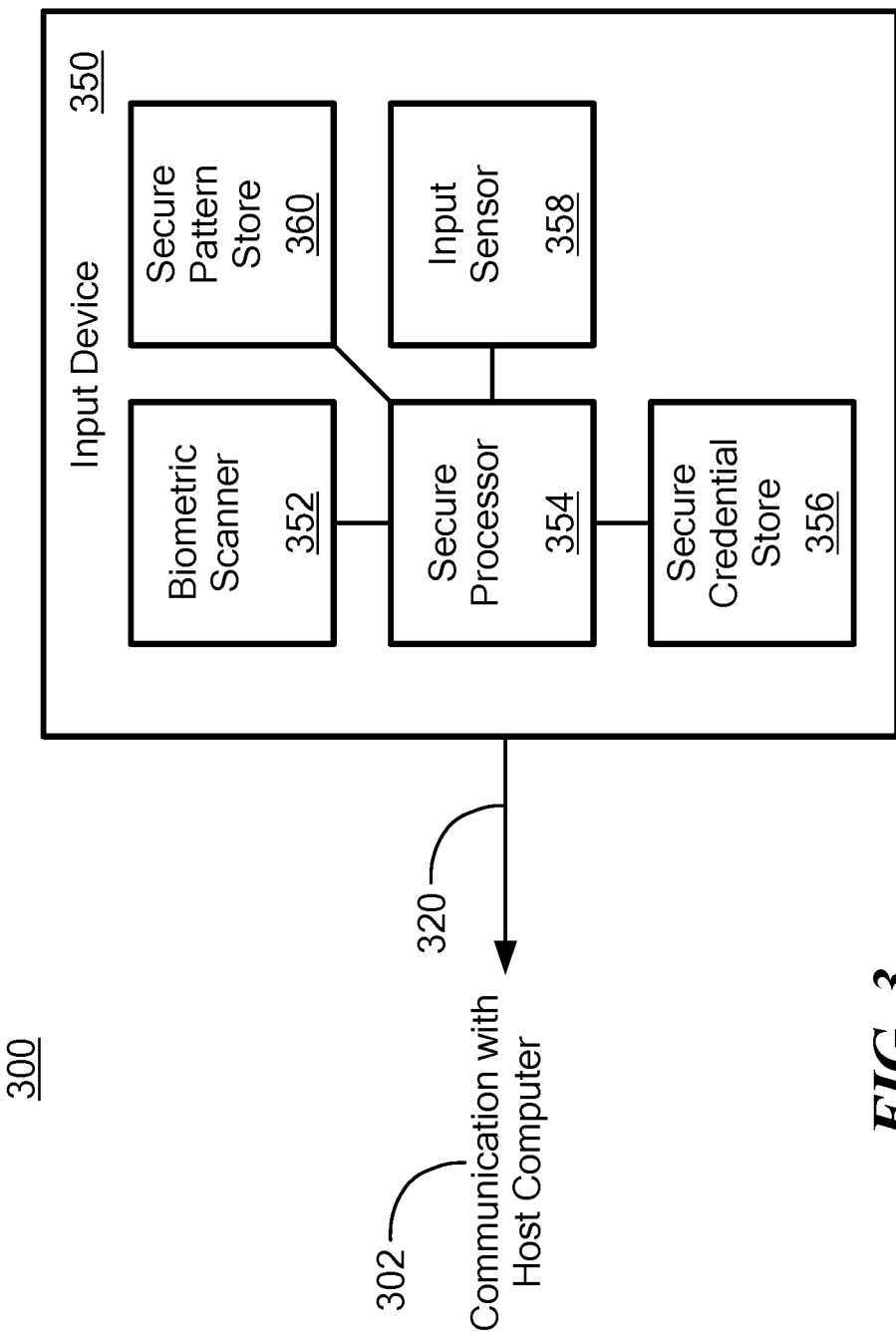
FIG. 3 is a block diagram of a system upon which authenticated intention processes may be implemented in accordance with a second embodiment.

Turning now to FIG. 3, a system 300 in which authenticated intention processes may be implemented utilizing pattern matching as the biometric authentication technique will now be described. The system 300 includes an input device 350 communicatively coupled to a host system computer 302. The host system computer 302 may be implemented as a general-purpose desktop or personal computer. In this embodiment, the input device 350 may be a computer mouse, as will be described further herein. In an embodiment in which the input device is a computer mouse, it is understood that a communication link 320 between the input device 350 and the host system computer 302 may be a direct wired connection or a wireless communication connection.

It will be understood that the host system computer 302 may be implemented via other types of devices, such as a portable computer device (e.g., a laptop or wireless communication device, such as a smart phone, personal digital assistant, or tablet PC). In this embodiment, the input device 350 may include components of a touchscreen built into the host system computer 302, as will be described further herein. An end user may access the features of the techniques described herein via the input device 350.

The input device 350 includes a biometric scanner 352, a secure processor 354, a secure credential store 356, an input sensor 358, and a secure pattern store 360.

Input sensor 358 provides motion measurement of input (e.g., a mouse traveling on a desktop or a finger traveling on a digitizer screen), as well as an indication of input selection (e.g., either pressing a button on the mouse or pressing/tapping a digitizer screen). It is important that the input selection distinguishes pressing and releasing as separate events. There must be some notion of the duration of the input selection for optimal security. If the input device 350 does not distinguish input selection duration, the techniques may still be accomplished by specifying the duration as one of the configuration settings for the device. When the input sensor 358 indicates a pressed event, the biometric scanner 352 is triggered to acquire a fingerprint scan. The secure processor 354 utilizes pattern matching for implementing biometric authentication of a subject and to unlock credentials in the secure credential store 356. In pattern matching, the access control decision is made by the secure processor 354 using well established pattern matching techniques for biometric fingerprint data. This involves an on-board pattern storage for the subject's fingerprint (e.g., secure pattern store 360).

Both of these biometric authentication techniques, i.e., biometric key derivation and pattern matching, utilize a previous step of enrollment whereby the subject's fingerprint is provided either to initially lock the credentials (in the case of biometric key derivation), or to provide the sample for later comparison (in the case of pattern matching). When the input sensor 158/358 reports the release event, the secure processor 154/354 locks the secure credential store 156/356 thereby preventing access to private key operations.

Figure 4:
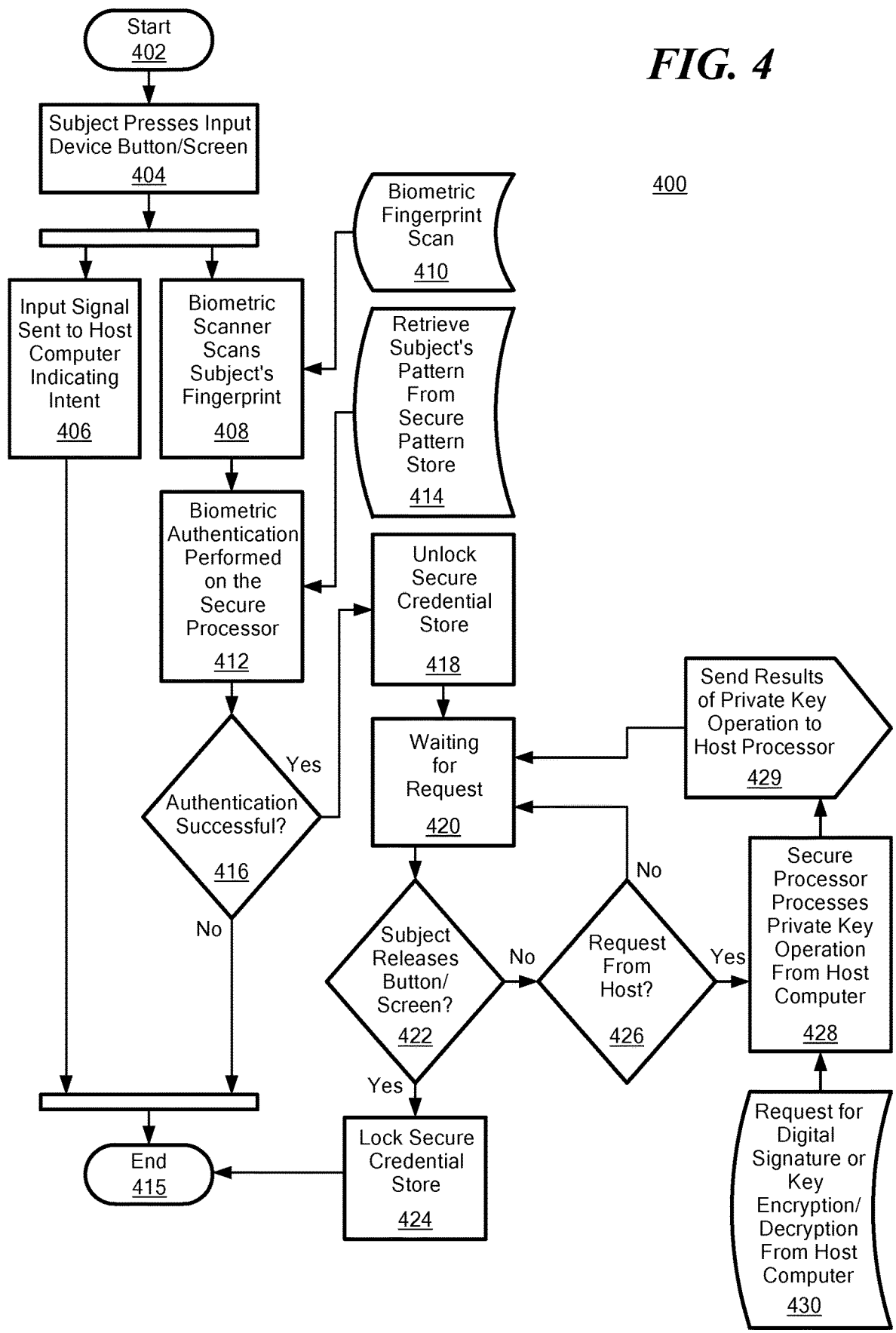
FIG. 4 is a flow diagram illustrating a process for performing authenticated intention processes with respect to the system of FIG. 3 in accordance with an embodiment.

Turning now to FIG. 4, a flow diagram illustrating a process 400 for performing authenticated intention processes with respect to the system of FIG. 3 will now be described in accordance with an embodiment. The process 400 of FIG. 4 utilizes pattern matching as the biometric authentication technique.

The process 400 begins in block 402 in which a subject presses an input device button (e.g., a mouse button) or screen (e.g., touch screen) in block 404. The thread that sends the input signal to the host computer 302 has no subsequent actions in the process 400; thus, the flow for this action thread ends at block 415. In block 406, an input signal is sent to the host computer 402 indicating an intent by the subject. In block 408, which may occur simultaneously with block 406, the biometric scanner 452 scans the subject's fingerprint. In block 410, the biometric scan is temporarily stored in a volatile memory location of the input device 350 prior to processing it. In pattern matching, as part of an enrollment process, user fingerprints are scanned and stored in a non-volatile memory and the newly scanned fingerprint is compared to the store of fingerprints in the non-volatile memory (secure pattern store) as part of the authentication process.

In block 412, biometric authentication is performed by the secure processor 354. The subject's pattern is retrieved from the secure pattern store 360 in block 414 and, at block 416, it is determined whether the authentication is successful (e.g., a match between the scanned fingerprint and the fingerprints stored in the secure pattern store is found) if not, the process 400 ends at block 415. Otherwise, the secure credential store 356 is unlocked at block 418.

At block 420, the input device 350 waits for a request (e.g., waits to receive a request for a private key operation or an indication that the input button was released). The input device 350 determines whether the subject has released the button or screen press at block 422. If so, the secure credential store 356 is again locked in block 424 and the process 400 ends at block 415. Otherwise, the input device 350 determines whether a request from the host computer 302 has been received at block 426. The request may be for a private key operation. If no request is received from the host computer 302, the input device 350 continues to wait for a request for the duration of the button/screen press at block 420. Otherwise, at block 426, if a request from the host system computer 302 is received, the secure processor 354 processes the private key operation from the host computer 302 at block 428. This private key operation includes a request for a digital signature, encryption/decryption, or identification from the host computer 402 at block 428. Once the requested private key operation is performed, the results are sent to the host in block 429.

As shown and described in FIG. 4, the process 400 illustrates a loop condition between blocks 420-430. For example, the input device 350, for the duration of the subject input button/screen press, continuously waits for and receives requests and processes them. Once the subject releases the input button or screen press, the loop ends and the secure credential store 356 is locked (blocks 422-424).

Figure 5A:
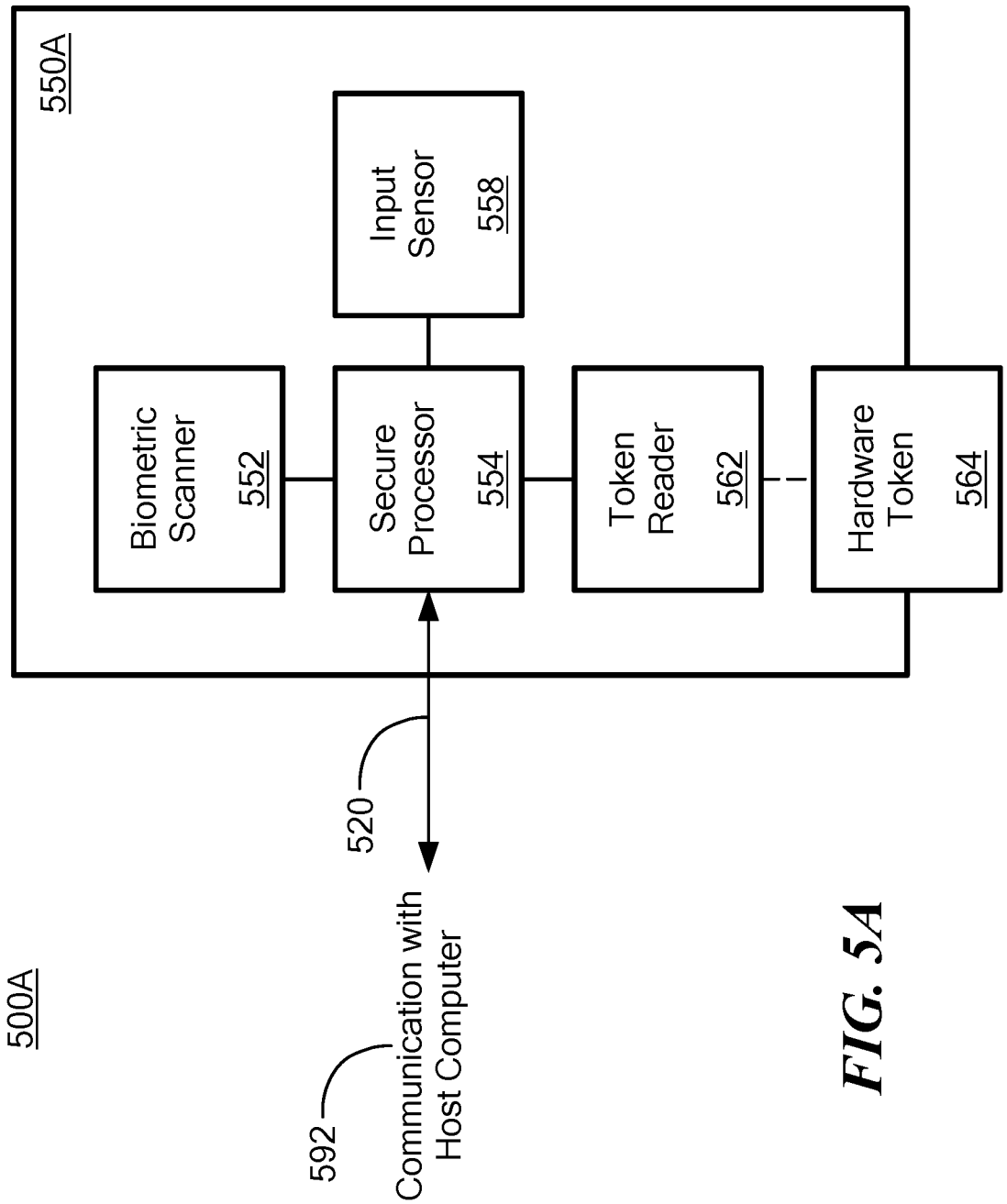
FIGS. 5A-5B are diagrams of a system upon which authenticated intention processes may be implemented in accordance with a third embodiment.
Figure 5B:
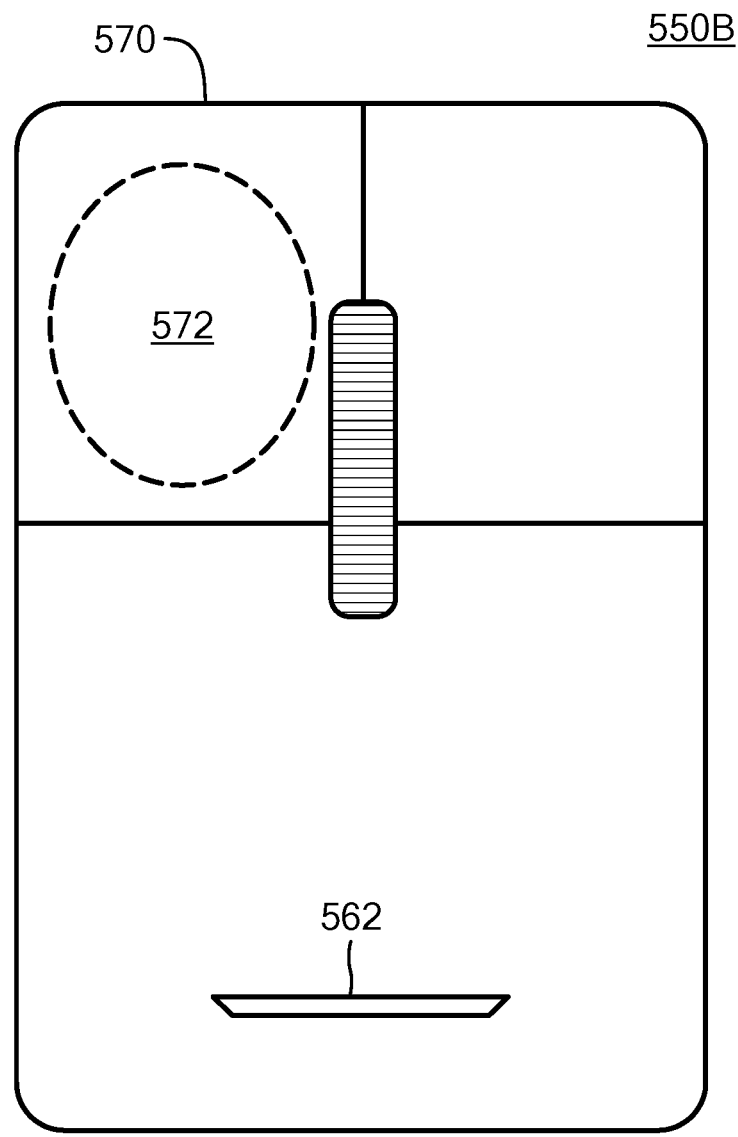

Turning now to FIGS. 5A-5B, a system in which authenticated intention processes may be implemented using a computer-attached mouse (e.g., via a desktop or laptop) will now be described in accordance with an embodiment. A desktop/laptop embodiment enhances a computer mouse with the additional elements shown in FIGS. 5A-5B. It will be understood that the input device 550A illustrates a block diagram of a mouse, and an example corresponding mouse 550B is illustrated in FIG. 5B. As such, the device 550A and mouse 550B are described interchangeably herein as "input device 550".

The input sensor 558 provides the typical inputs provided by the mouse 550 and the biometric scanner 552 is embedded in the mouse button (shown at 572 in FIG. 5B). A token reader 562 is integrated into the device 550 and accepts a removable hardware token 564. This removable hardware token 564 may support different form factors including a smartcard or USB form factor hardware token. In an alternative embodiment, a secure element (not shown) may be built into the device 550. The computer mouse 550 includes the biometric scanner 552 built into a mouse button 570 and a hardware token reader 562 for the removable hardware token 564. The hardware token reader 562 may be built into the back of the computer mouse 550. In this embodiment, the biometric scanner 552 is a fingerprint scanner. It will be understood that the biometric scanner 552 may be embedded in other locations of the computer mouse 550, e.g., including one or more buttons of the computer mouse 550 in order to realize the advantages of the techniques described herein.

When a user clicks the computer mouse, e.g., button 570, the fingerprint scanner 552 is activated. The biometric authentication process is performed entirely on an embedded processor (e.g., secure processor 554) of the mouse 550 to unlock access to private key operations on the inserted hardware token (e.g., token 564 of FIG. 5A). As indicated above, the biometric authentication process may use pattern matching approaches (e.g., comparing to a template available on the hardware token) or a biometric key derivation approach.

By embedding a fingerprint scanner in the input device 550 which is activated when the user selects an onscreen entity, the user is empowered to bind an assertion of physical presence and an unforgettable verification of identity to the intent explicit in click, touching or tapping the input device. By integrating the hardware token reader 562 or secure element into the input device 550 (with no access available to the host computer), a mechanism for the computer user to use certificate-based authentication without exposing those credentials to exfiltration via the host is enabled. This approach limits vulnerability to threats on the host computer (i.e. if credentials on stored on the host computer, malware may otherwise surreptitiously perform private key operations or exfiltrate credentials).

Figure 6:
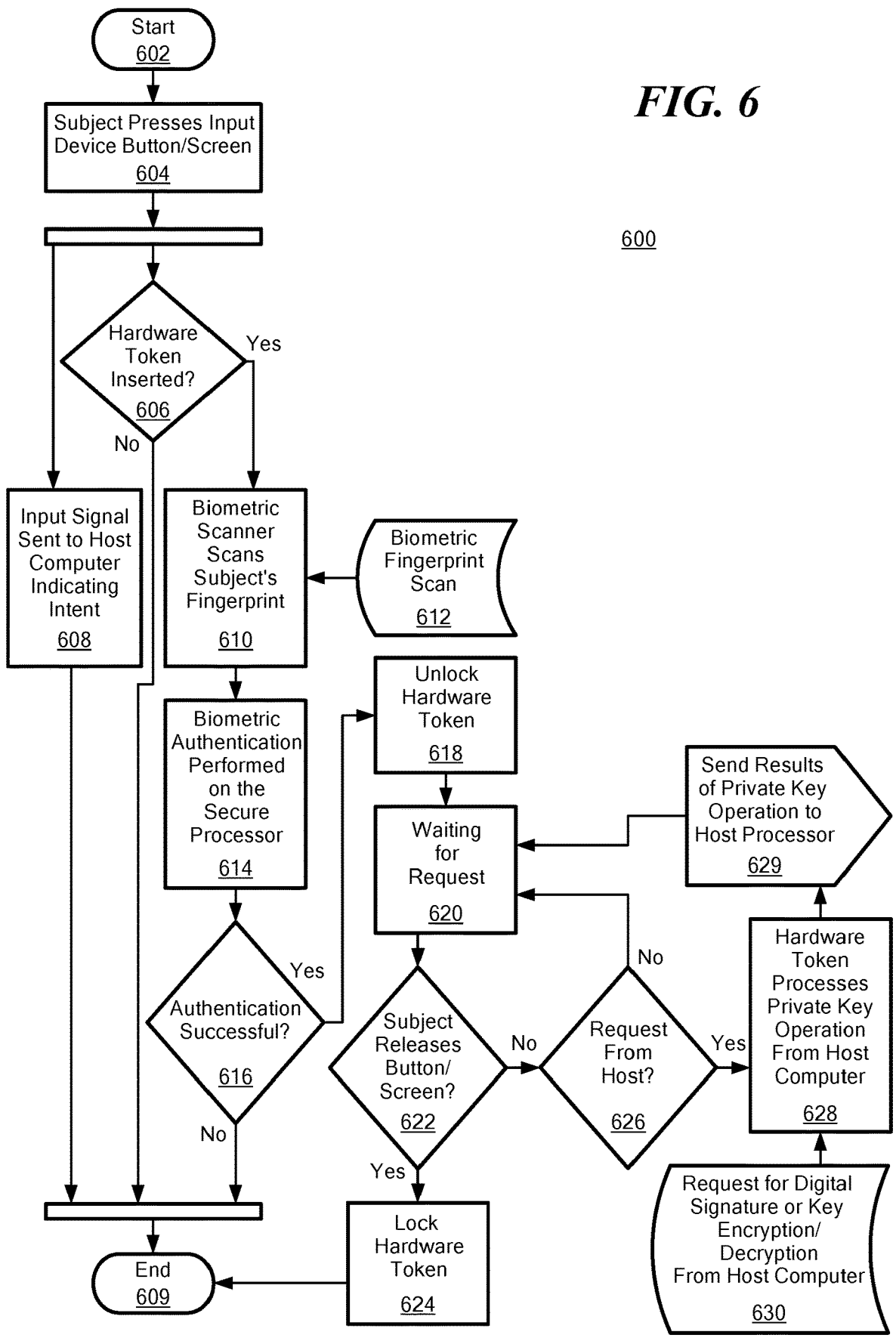
FIG. 6 is a flow diagram illustrating a process for performing authenticated intention processes with respect to the system of FIG. 5 in accordance with an embodiment.

Turning now to FIG. 6, a flow diagram illustrating a process 600 for performing authenticated intention processes with respect to the system of FIGS. 5A-5B will now be described in accordance with an embodiment.

The process 600 begins in block 602 in which a subject presses an input device button (e.g., a mouse button) or screen (e.g., touch screen) in block 604. In block 606, the input device 550 determines whether a hardware token 564 has been inserted into the input device 550. If the hardware token has not been inserted, the process 600 ends in block 609. In block 608, which may occur simultaneous with block 610, an input signal is sent to the host computer 502 indicating an intent by the subject. The biometric scanner 552 scans the subject's fingerprint in block 610 The scanning produces a biometric scan stored in volatile memory in block 612.

In block 614, biometric authentication is performed by the secure processor 554 (e.g., using a biometric authentication technique as described above with respect to FIGS. 2 and 4) and, at block 616, it is determined whether the authentication is successful. If not, the process 600 ends at block 609. Otherwise, the hardware token 564 currently inserted in the hardware token reader 562 is unlocked at block 618.

At block 620, the input device 550 waits for a request (e.g., waits to receive a private key operation request or an indication that the input button was released). The input device 550 determines whether the subject has released the button or screen press at block 622. If so, the hardware token 564 is again locked in block 624 and the process 600 ends at block 609. Otherwise, the input device 550 determines whether a request from the host computer 502 has been received at block 626. The request may be for a private key operation. If no request is received from the host computer 502, the input device 550 continues to wait for a request for the duration of the button/screen press at block 620. Otherwise, at block 626, if a request from the host system computer 502 is received, the hardware token 564 currently inserted into the token reader 562 processes the private key operation from the host computer 502 at block 628. This process includes a request for a digital signature, encryption/decryption, or identification from the host computer 502 at block 630. Once the requested private key operation is performed, the results are sent to the host.

As shown and described in FIG. 6, the process 600 illustrates a loop condition between blocks 620-630. For example, the input device 550, for the duration of the subject input button/screen press, continuously waits for and receives requests and processes them. Once the subject releases the input button or screen press, the loop ends and the hardware token 564 is locked (blocks 622-624).

Figure 7:
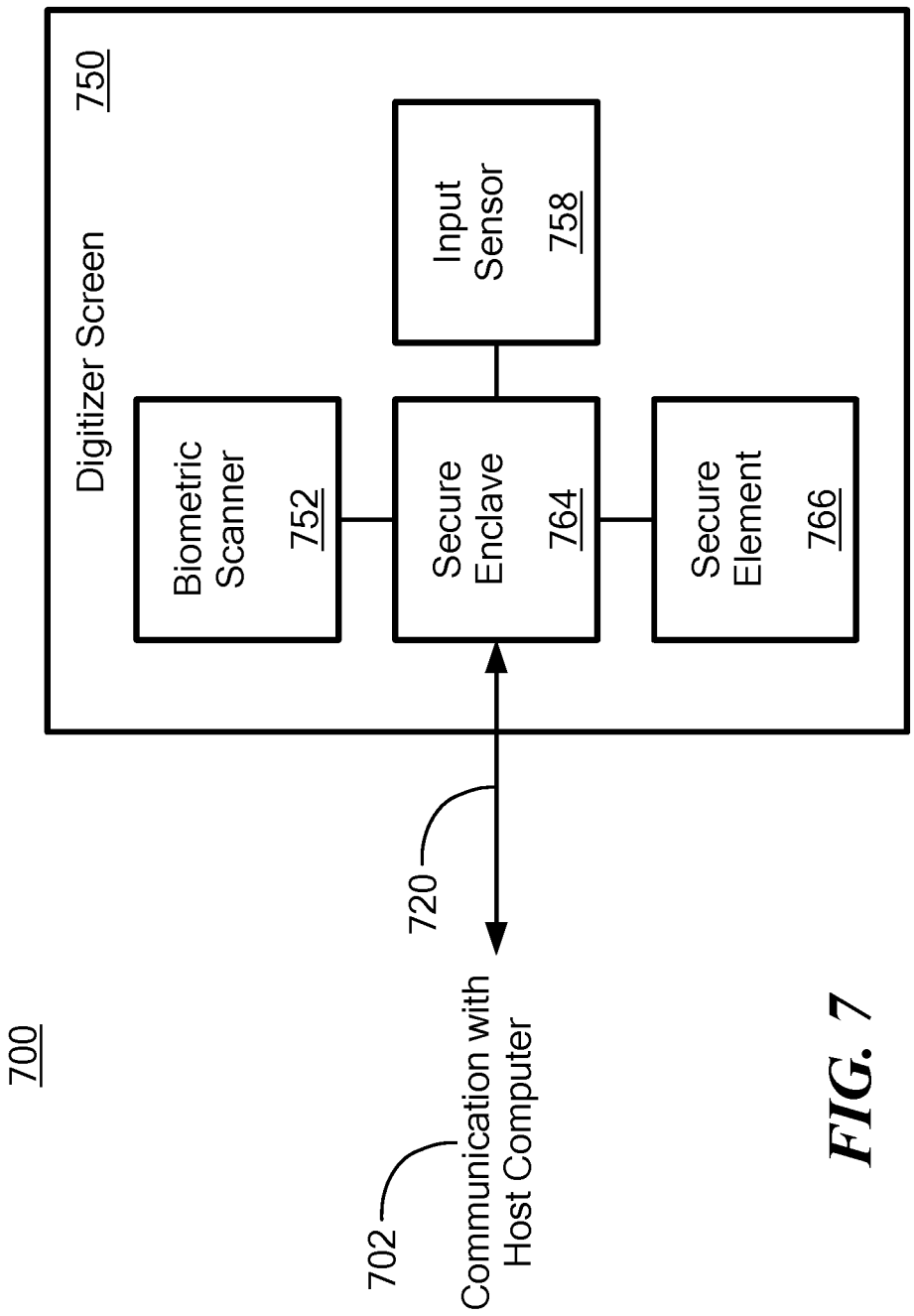
FIG. 7 is a block diagram of a system upon which authenticated intention processes may be implemented in accordance with a fourth embodiment.

Turning now to FIG. 7, a system 700 upon which authenticated intention processes may be implemented in accordance with a further embodiment will now be described. The system 700 includes a host system 702 and an input device 750. Together, the input device 750 and host system 702 may be implemented as a mobile computing device, such as a smart phone or tablet PC. The input device 750 may be implemented as a digitizer, which is augmented to enable the authenticated intention processes described herein. The digitizer screen receives user inputs.

The input device 750 includes a biometric scanner 752, a secure enclave 764, an input sensor 758, and a secure element 766. In some implementations of the mobile embodiment, the secure enclave and secure element may be a single component comprising the functions of these two components described separately herein. The biometric scanner is embedded underneath the digitizer screen and spans substantially the entire length and width of the digitizer screen (i.e., active portions thereof).

The input sensor 758 provides motion measurement of input (e.g., a finger traveling on the digitizer screen), as well as an indication of input selection (e.g., pressing/tapping the digitizer screen). As indicated above, it is important that the input selection distinguishes pressing and releasing as separate events. There must be some notion of the duration of the input selection for optimal security. If the input device 750 does not distinguish input selection duration, the techniques may still be accomplished by specifying the duration as one of the configuration settings for the device. When the input sensor 758 indicates a pressed event, the biometric scanner 752 is triggered to acquire a fingerprint scan.

The secure enclave 764 performs security sensitive computation rather than the main processor of the device. The secure enclave 764 processes the biometric authentication. The digitizer, through the biometric scanner 752, sends its scans to the secure enclave for processing over an encrypted channel secured by a pre-shared key.

The secure element 766 may be implemented as a smartcard in one non-limiting embodiment. In an embodiment, the digitizer, in addition to sending the biometric scan, also sends the location of the user's finger on the digitizer pad. The secure enclave 764 then processes the biometric authentication unlocking private key operations on the secure element 766. The input (e.g., finger) location received from the digitizer may be signed with the subject's private key and sent to the host processor 702 as an authenticated click. This authenticated click reflects unforgeable evidence that a user clicked a certain spot of the digitizer. In order to ensure the authenticity of the input, the biometric authentication must be sole means of authorizing private key operations for a private key which uniquely identifies the subject.

The system 700 of FIG. 7 enables the technique described herein to take advantage of the secure enclave 764 and secure element 766 available on the device 750 rather than adding dedicated cryptographic processing and secure storage. It also provides an unforgeable indication of the exact location for the authenticated input.

Figure 8:
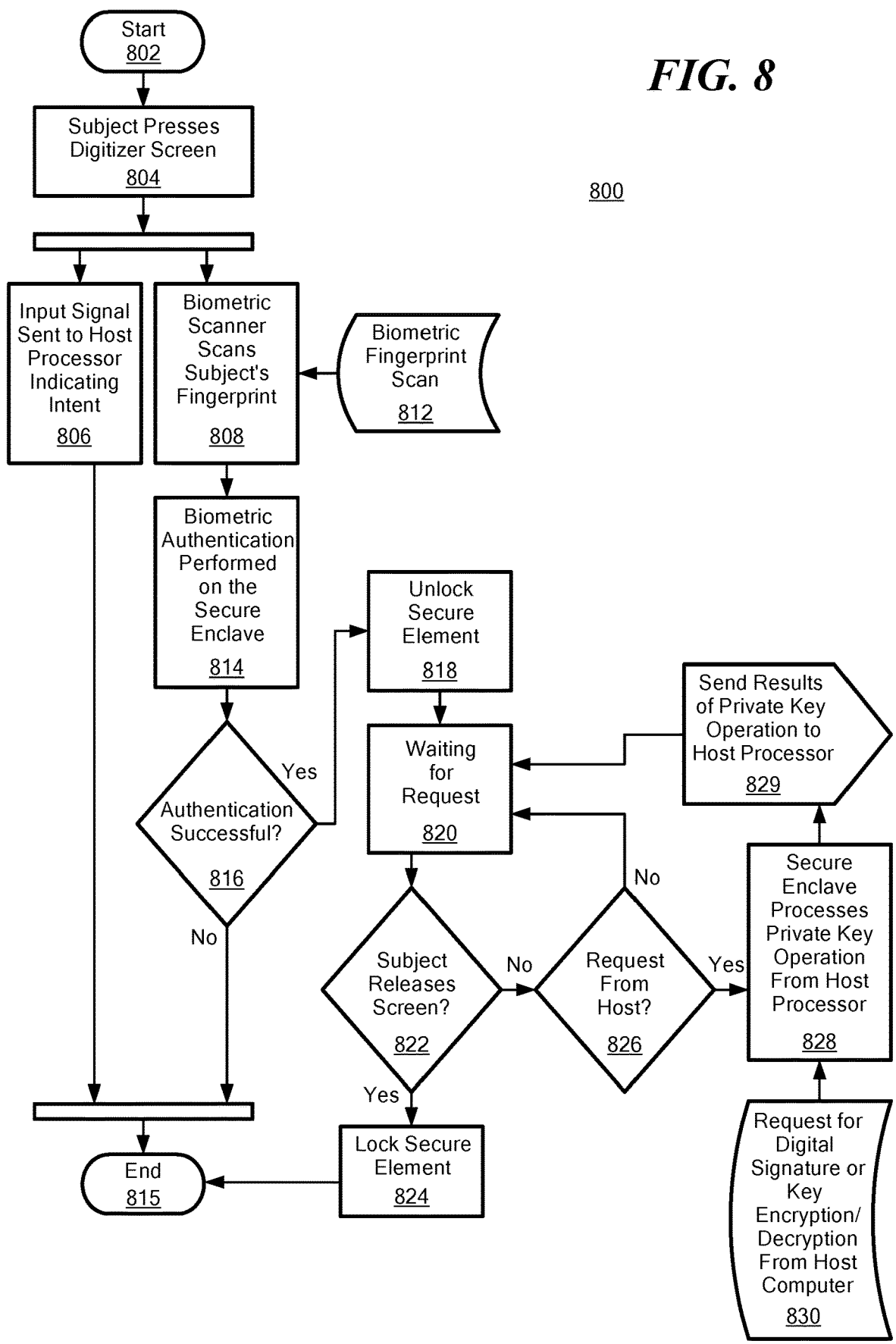
FIG. 8 is a flow diagram illustrating a process for performing authenticated intention processes with respect to the system of FIG. 7 in accordance with an embodiment.

Turning now to FIG. 8, a process 800 for performing authenticated intention with respect to the system 700 shown in FIG. 7 will now be described in accordance with embodiments. The process 800 is described with respect to iOS® mobile devices for ease of description. However, it will be understood that the process 800 can be applied to Android® devices or other devices that utilize similar hardware features. Turning now to FIG. 8, a flow diagram illustrating a process 800 for performing authenticated intention processes with respect to the system of FIG. 7 will now be described in accordance with an embodiment.

The process 800 begins in block 802 in which a subject presses a digitizer screen (e.g., touch screen) in block 804. In block 806, an input signal is sent to the host computer 702 indicating an intent by the subject. In embodiments, an indication of intent refers to the presence of an input selection by a subject. The thread that sends the input signal to the host computer 702 has no subsequent actions in the process 800; thus, the flow for this action thread ends at block 815. In block 808, which may occur simultaneously with block 806, the biometric scanner 752 scans the subject's fingerprint. In block 812, the biometric scan is temporarily stored in a volatile memory location (not shown) in the input device 750 prior to processing it.

In block 814, biometric authentication is performed by the secure enclave 764 and, at block 816, it is determined whether the authentication is successful (e.g., successful decryption of the credentials). If not, the process 800 ends at block 815. Otherwise, the secure element 766 is unlocked at block 818.

At block 820, the input device 750 waits for a request (e.g., waits to receive a private key operation request or an indication that the input button was released). The input device 750 determines whether the subject releases the button or screen press at block 822. If so, the secure element 766 is again locked in block 824 and the process 800 ends at block 815. Otherwise, the input device 750 determines whether a request from the host computer 702 has been received at block 826. The request may be for a private key operation. If no request is received from the host computer 702, the input device 150 continues to wait for a request for the duration of the button/screen press at block 218. Otherwise, at block 224, if a request from the host system computer 702 is received, the secure enclave 766 processes the private key operation from the host computer 702 at block 828. This private key operation includes a request for a digital signature, encryption/decryption, or identification from the host computer 702 at block 830. Once the requested private key operation is performed, the results are sent to the host in block 829.

As shown and described in FIG. 8, the process 800 illustrates a loop condition between blocks 820-830. For example, the input device 750, for the duration of the subject input button/screen press, continuously waits for and receives requests and processes them. Once the subject releases the input button or screen press, the loop ends and the secure element 766 is locked (blocks 822-824).

In yet a further embodiment, the authenticated intention processes can be implemented for laptop computers having touch screen displays. As with mobile devices, the laptop display utilizes a digitizer; thus, it can provide an exact location for a user input. The biometric sensor (which is implemented by the digitizer) will have its own secure co-processor and the secure co-processor exclusively controls access to private key operations on the smartcard. The digitizer and secure co-processor can use pre-shared symmetric keys to create a secure communications channel, and the secure co-processor can authenticate the biometric input, unlock the smartcard, and digitally sign the location and timestamp from the digitizer before forwarding it to the host processor.

Turning now to FIG. 9, a block diagram of a system 900 upon which authenticated intention processes may be implemented in accordance with a further embodiment will now be described. The system 900 of FIG. 9 enables an input device to limit private key operations to specific on-screen entities. The system 900 includes an input device 950 communicatively coupled to a host system computer 902. The host system computer 902 may be implemented as a general-purpose desktop or personal computer. In this embodiment, the input device 950 may be a computer mouse, as will be described further herein. In an embodiment in which the input device is a computer mouse, it is understood that a communication link 920 between the input device 950 and the host system computer 902 may be a direct wired connection or a wireless communication connection.

It will be understood that the host system computer 902 may be implemented via other types of devices, such as a portable computer device (e.g., a laptop or wireless communication device, such as a smart phone, personal digital assistant, or tablet PC). In this embodiment, the input device 950 may include components of a touchscreen built into the host system computer 902, as will be described further herein. An end user may access the features of the techniques described herein via the input device 950.

The input device 950 includes a biometric scanner 952, a secure processor 954, a secure credential store 956, and an input sensor 958.

Input sensor 958 provides motion measurement of input (e.g., a mouse traveling on a desktop or a finger traveling on a digitizer screen), as well as an indication of input selection (e.g., either pressing a button on the mouse or pressing/tapping a digitizer screen). It is important that the input selection distinguishes pressing and releasing as separate events. There must be some notion of the duration of the input selection for optimal security. If the input device 950 does not distinguish input selection duration, the techniques may still be accomplished by specifying the duration as one of the configuration settings for the device. When the input sensor 958 indicates a pressed event, the biometric scanner 952 is triggered to acquire a fingerprint scan.

The host computer 902 includes an operating system 904 communicatively coupled to a window manager 906, an application 910, and a sequencer/counter 908. The host computer 902 provides data related to the digital entities on the screen to the input device 950. This data describes the object and the associated event. For example, an object may be a legal document and the event is a digital signature. If a legal document is to be signed, the user clicks using the input device, selecting an onscreen element. The element may be the entire legal document, or a portion of the document that needs to be, for example, initialed. That information is provided to the input device 950, which signs the submitted material.

The input device 950, as well as the above-described input devices 150, 350, 550, and 750, is used to sign and/or decrypt data, as private keys will be stored therein. The host computer 902 may be used to verify and encrypt data, as the host computer 902 may have higher performance capabilities, and access to the public keys is not sensitive. While the embodiments described herein assume that public key material is local to the host computer 902 or input device 950, it will be understood that the public key material can be stored remotely in a public key infrastructure and retrieved as needed using usual methods. In both cases, it is assumed that a portion of the operating system 106 is responsible for either retrieving the local or remote key and acting on the data, or for submitting the data to a secure enclave or secure processor for processing.

It is possible to protect and control access to individual objects on a computer, e.g., initializing a paragraph in a document. A general interaction is for a user to select an object by touching or clicking that object, and in the context of the running application (e.g., application 910), this means "at this moment in time, I give the application my permission to take a specific action on this object." The selection may be performed using a finger on a digitizer screen, or by using a mouse to select the object. This puts the user's finger on a sensor (e.g., input sensor 958), which can be used to identify and authenticate the user granting the permission. The selection is at a particular location on the screen, of an object that is at that location of the screen. The operating systems' 904 window manager 906 converts mouse and selection activities to particular locations in the window of an application. Finally, the application knows both the object that is represented on the screen, and the action specified by the gesture performed on that object.

This last activity may require two selections: one for selecting the object, and one for selecting a requested action. In the above example, the user may select the paragraph to initial, and then select either a box indicating agreement or disagreement with the terms.

An event may be specified as follows:

Action package=$f$(application with focus,location, object selected,(optionally) action requested)

This mapping can be assigned by several of the elements depicted in the host computer 902. One embodiment may be to have a layered approach to assigning requested actions. In the most complete example, all of these may be performed; however, it is possible to incrementally implement portions of thereof. The operating system 904 may define default actions for all objects it is aware of. The window manager 906 may layer another set of defaults over this, adding default requested actions for objects that appear on a screen or other input device. Finally, the application 910 may describe specific requested actions for specific objects.

Returning to the legal document example, the operating system 904 may describe actions related to storing files, e.g., that all files are encrypted, authenticated, and integrity checked.

As one example, the window manager 906 may describe requested actions related to any text objects displayed in a window. Finally, the application 910 may further refine this to decide that a selection event refers to just a paragraph of text and may then associate the requested action of digitally signing that text by the authenticated user.

One challenge may be how to determine which of the several applications potentially running and expecting an event from the input device 950 should be chosen to submit the action package. Since it is possible that an event notification would reach all the running applications, and a malicious application may choose to lie about its status and pretend to have a right on a private key operation—an "arbiter" is needed. The window manager 906 or the operating system 904 may be configured as the arbiter. The arbiter, based on the knowledge of what applications currently have active windows on the screen, what locations those windows occupy, how those windows are layered on top of each other, and what location the click event maps onto, would be configured to:

a. decide which application is intended to receive the event (i.e., what application had its window on top, is the window clearly visible to a user, so the user's click should go there), and b. control the communications between the application(s) and the Input Device, passing to the Input Device messages only from the appropriate application.

Thus, the following tuple defines the implied action:

Log entry=$f$(authenticated user, action, time)

The process of authenticating the user and the purpose of selecting action has been thus far described. Time can be encoded in various ways. Although the most natural way to encode time is to encode the actual time, it is understood that other approaches will work for most use cases as well. Examples of other approaches include a counter that increases monotonically, or a permutation such as chain hashing where it is possible to discern the order of values. Numbers that do not provide sequence information will also work but will not support sequences of operation.

In the most general case, one needs to trust the biometric sensor system (e.g., biometric scanner 952) to provide the correct user, the operating system 904 to provide the correct time, the window manager 906 to provide the correct location, and the application 910 to provide the correct object and action selected. Additionally, the operating system 904 is providing the communications channel between the input device 950, window manager 906 and application 910.

Turning now to FIG. 10, a process for providing authenticated intention processes that limit private key operations to specific on-screen entities will now be described. FIG. 10A describes the process from the perspective of the input device, and is substantially the same as the flow diagrams shown for previous embodiments. In the embodiment shown in FIG. 10A, the process provides support for processing authorization packages rather than just private key operations.

The process 1000 begins in block 1002 in which a subject presses an input device button (e.g., a mouse button) or screen (e.g., touch screen) in block 1004. In block 1006, an input signal is sent to the host computer 902 indicating an intent by the subject. In embodiments, an indication of intent refers to the presence of an input selection by a subject. The thread that sends the input signal to the host computer 902 has no subsequent actions in the process 1000; thus, the flow for this action thread ends at block 1015. In block. 1008, which may occur simultaneously with block 1006, the biometric scanner 952 scans the subject's fingerprint. In block 1010, the biometric scan is temporarily stored in a volatile memory location in the input device 950 prior to processing it. In biometric key derivation, a user is first enrolled in which new credentials are generated in the secure credential store. The user would apply their finger to a biometric sensor and the fingerprint would be scanned. The newly generated credentials would be encrypted with a cryptographic key derived from their fingerprint. When the user later uses the system, their fingerprint scan is converted into the same cryptographic key. Fuzzy extraction techniques may be used to correct for errors in the image processing (e.g. finger slightly misaligned). The secure processor then attempts to decrypt the credentials in the secure credential store using the derived cryptographic key. If the derived cryptographic key matches the cryptographic key derived during enrollment, those credentials can be decrypted and used for private key operations until the input button is released. Releasing the input button zeroizes the derived cryptographic key, effectively "locking" access to the secure credential store.

In block 1012, biometric authentication is performed by the secure processor 954 and, at block 1014, it is determined whether the authentication is successful (e.g., successful decryption of the credentials). If not, the process 1000 ends at block 1015. Otherwise, the secure credential store 956 is unlocked at block 1016.

At block 1018, the input device 950 waits for a request (e.g., waits to receive a private key operation request or an indication that the input button was released). The input device 950 determines whether the subject has released the button or screen press at block 1020. If so, the secure credential store 956 is again locked in block 1022 and the process 1000 ends at block 1015. Otherwise, the input device 950 determines whether a request from the host computer 902 has been received at block 1024. The request may be for a private key operation. If no request is received from the host computer 902, the input device 950 continues to wait for a request for the duration of the button/screen press at block 1018. Otherwise, at block 1024, if a request from the host system computer 902 is received, the secure processor 954 processes the private key operation from the host computer 902 at block 1026. This private key operation may be a digital signature, encryption/decryption, or identification request from the host computer 902 at block 1028. Once the requested private key operation is performed, the results are sent to the host 902 at block 1029

As shown and described in FIG. 2, the process 200 illustrates a loop condition between blocks 1018-1028. For example, the input device 950, for the duration of the subject input button/screen press, continuously waits for and receives requests and processes them. Once the subject releases the input button or screen press, the loop ends and the secure credential store 956 is locked (blocks 1020-1022).

The host's process is illustrated in FIG. 10B. The process 1050 begins in block 1052 in which an action requiring authentication/authorization occurs in block 1054. The application first confirms that the action originates from the currently selected entity in block 1056. If not, an error is returned in block 1058. Otherwise, in block 1060 the window manager 906 then confirms that the action originates from the application which currently has focus, meaning that the application is "on top" of all other windows, is not transparent, and is the current focus of input selection. If any of these conditions does not hold, an error is returned in block 1058. Otherwise, an authorization package is created in block 1062 and sent to the input device in block 1064, where the processing follows the flow diagram illustrated in FIG. 10A. If the authorization was unsuccessful in block 1066, an error is returned. Otherwise, the entity that generated the action receives the results of the private key operation performed by the input device in block 1068 and the process ends 1070.

This approach allows for a natural interaction with many, commonly used applications.

As a first example, most computers store data in files, and have special-purpose file selection tools, user interface widgets, and file navigation applications (e.g., Apple's Finder). When an application only modifies files, it is possible to reduce the system trust to the input device, the operating system, and the file selection tool provided by the operating system. While the window manager may have default actions associated with on-screen objects, those may never be used if the operating system vendor builds the file navigation application with specific actions.

As a second example, consider the case where computers are used to produce documents, sometimes for legal and other record keeping. Today, the requestor (e.g., an attorney, an HR representative, a realtor, a sales clerk, etc.) will send a document to a user via email, and they will sign that document on a computer/tablet or phone that they own and control. Often this is convenient, but sometimes it's more convenient for a user to sign a document on a tablet or computer available at the establishment. When this is desirable, it is possible to develop a tool that enables a user to review and digitally sign the form. In this case, one needs to trust the input device, the operating system, and the form signing tool that may be delivered by the tablet producer.

In addition to performing a single action, it is important that sequences of actions be reproducible. If the sequence occurs on the same document, then the action will be stored as nested information in the usual manner:

[[Doc|Act1]|Act2]

This indicates that Act1 was taken on Doc, and Act2 was taken on that package of data. The vertical line indicates concatenation.

Returning to the legal document example, signatures can be stored as nested information in the usual manner:

[[Doc|Sig1]|Sig2]

This says that Sig1 signs Doc, and Sig2 signs that complete package of data. The latest signature is the outermost signature, in this case, Sig2.

However, it is important that separate documents also be comparable, and when this is needed, then additional metadata needs to be included in the document. This is easily done as described above and depicted here for our legal document example:

[[Doc|Time1|Sig1]|Time2|Sig2]

Now the context can be compared on documents signed by different devices and the order can be recovered. Returning to full generality, we want to include context for the action being taken, which could be recorded as follows:

[[Doc|Context1|Act1]|Context2|Act2]

Actions and their associated context can also be recorded as log entries. The log can then be queried to answer questions about the order of actions taken. In the above-referenced signed document example, it is possible to see the order of signing of separately prepared riders on a legal document, by comparing the objects and the time that the signing events occurred.

We claim:

1. A system for authenticating an end user, the system comprising:
   a memory corresponding to a secure credential store having user credentials stored therein and further comprising computer-executable instructions;
   an input device comprising a touch screen having a biometric scanner provided as part thereof, the touch screen having on-screen objects rendered at locations on the touch screen and having an input sensor configured to: (1) distinguish the end user pressing and releasing the touch screen with a finger as separate events; (2) provide motion measurement of the finger across the touch screen; (3) determine a duration of the end user maintaining the finger on an biometric scanner portion of the touch screen; and (4) in response to the on-screen objects being touched by the finger, to generate an event; and
   a secure processor coupled to the touch screen and the secure credential store, the processor for executing the computer-executable instructions, the computer-executable instructions when executed by the secure processor cause the secure processor to perform operations comprising:
      receiving, at the touch screen, input signals representing an input gesture of the end user caused by the finger of the end user touching at least one of the on-screen objects and representing an explicit assertion of end user intent to cause a function to be performed on the at least one of the on screen objects;
      the input gesture corresponds to the end user pressing and releasing the touch screen with the finger and the finger of the end user moving across the touch screen and the end user maintaining the finger on the biometric scanner portion of the touch screen for a period of time; and
      in response to the finger of the end user touching the at least one of the on-screen objects on the touch screen, the secure processor is configured to simultaneously authorize and authenticate the user via biometric authentication of the user, with respect to the function, from data acquired from the input gesture;
      wherein the at least one of the on-screen objects is a file object.

2. The system of claim 1 wherein:
   the function to be performed on the system by the end user is selecting an object on the touch screen to execute an associated event;
   wherein touch screen is further configured to receive the data provided thereto and to protect and control access to individual digital entities rendered on the touch screen and wherein the end user gives an application permission to take a specific action on a digital entity stored on a computer system by the end user selecting the digital entity by pressing on the touch screen while the application is executing;
      wherein in response to the end user placing the finger on the touch screen and touching the biometric scanner, the input sensor:
         generates a pressed event; and
      in response to the input sensor generating a pressed event, the biometric scanner acquires a fingerprint scan; and
         wherein, in response to the scanned fingerprint, the secure processor authorizes and authenticates the end user, and in response to the end user being authorized and authenticated, the touch screen grants the end user permission to select the object on the touch screen and execute an associated event.

3. A system for authenticating one or more users, the system comprising:
   a memory corresponding to a secure credential store having user credentials stored therein and further comprising computer-executable instructions;
   a touch screen having a biometric scanner provided as part thereof, the touch screen configured to render on-screen objects at locations on the touch screen and having an input sensor configured to: (1) distinguish a user of the one or more users pressing and releasing the touch screen at the locations of the on-screen objects with a finger as separate events; (2) to provide motion measurement of the finger across the touch screen; (3) to determine a duration of the user maintaining the finger on an biometric scanner portion of the touch screen; and (4) in response to the on-screen objects being touched by the finger, to generate an event; and
   a secure processor coupled to the touch screen and the secure credential store, the processor for executing the computer-executable instructions, the computer-executable instructions when executed by the secure processor cause the secure processor to perform operations comprising:
   receiving, at the touch screen, input signals representing an input gesture of the end user corresponding to touching, by the user, at least one of the on-screen objects with the finger, at the location of the at least one of the on-screen objects and the user maintaining the finger on the biometric scanner portion of the touch screen for a period of time; and
   wherein, in response to the user touching the on-screen object at the location, the secure processor is configured to simultaneously authorize and authenticate the user via biometric authentication of the user from data acquired from the input gesture
   wherein the on-screen objects are files.

* * * * *